United States Patent
Krause et al.

(10) Patent No.: US 10,332,117 B2
(45) Date of Patent: Jun. 25, 2019

(54) SYSTEM AND METHOD FOR MOBILE DEVICE SELF-CHECKOUT FOR RETAIL TRANSACTIONS WITH LOSS PROTECTION

(71) Applicant: NewStore, Boston, MA (US)

(72) Inventors: Kai-Thomas Krause, Berlin (DE); Ulrike Vanessa Mueller, Berlin (DE)

(73) Assignee: NewStore, Inc., Boston, MA (US)

( * ) Notice: Subject to any disclaimer, the term of this patent is extended or adjusted under 35 U.S.C. 154(b) by 0 days.

(21) Appl. No.: 15/040,758

(22) Filed: Feb. 10, 2016

(65) Prior Publication Data

US 2017/0046707 A1    Feb. 16, 2017

Related U.S. Application Data

(60) Provisional application No. 62/204,619, filed on Aug. 13, 2015.

(51) Int. Cl.
| | |
|---|---|
| *G06Q 20/40* | (2012.01) |
| *G06Q 10/08* | (2012.01) |
| *G06Q 20/20* | (2012.01) |
| *G06Q 20/32* | (2012.01) |
| *G07G 1/00* | (2006.01) |

(52) U.S. Cl.
CPC ....... *G06Q 20/4016* (2013.01); *G06Q 10/087* (2013.01); *G06Q 20/203* (2013.01); *G06Q 20/204* (2013.01); *G06Q 20/3278* (2013.01); *G07G 1/00* (2013.01)

(58) Field of Classification Search
CPC ........ G06Q 30/00; G06Q 10/00; G06Q 30/06; G06Q 40/12; G06Q 10/083; G06Q 10/08; G06F 17/30; G06F 17/00; G06F 3/048
USPC ...... 705/26.7, 26.81, 14.53, 39, 14.1, 14.54, 705/17, 44, 26.1; 235/375
See application file for complete search history.

(56) References Cited

U.S. PATENT DOCUMENTS

| | | | | |
|---|---|---|---|---|
| 6,144,848 A | * | 11/2000 | Walsh | G06K 7/10 235/379 |
| 7,848,953 B2 | * | 12/2010 | Kahlon | G06Q 10/08 705/22 |
| 8,352,382 B1 | * | 1/2013 | Katta | G06Q 50/28 705/330 |

(Continued)

FOREIGN PATENT DOCUMENTS

WO    WO2015061730 A1    4/2015

OTHER PUBLICATIONS

UK Intellectual Property Office, "Combined Search and Examination Report Under Sections 17 and 18(3)—App. No. GB1606273.9", dated Jun. 30, 2016.

*Primary Examiner* — Olusegun Goyea
(74) *Attorney, Agent, or Firm* — Intrinsic Law Corp.

(57) ABSTRACT

The disclosure relates to mobile device retail self-checkout with incorporated theft detection system and methods thereof. Aspects of the invention employ asset tracking, mobile phone scanning and self-checkout in a retail environment. Specifically, a mobile device application in communication with a transaction system has to capacity to complete unassisted self-checkouts. Other aspects include providing a transaction system using a mobile device application interfacing therewith. Additionally, the present invention has the capacity to interface with existing anti-theft technologies, such as, RFID or similar RF tagging and reading which can determine thefts and process exceptions of unique items.

13 Claims, 11 Drawing Sheets

Item Database

| | |
|---|---|
| 201 EPC Number | The number from the label either GTIN + serial number or a unique number |
| 202 GTIN (or product id) | A reference number into the product master database. |
| 203 Status | The labels status. |
| 204 Kill Password | An optional password, which can be used to deactivate (= kill) the RFID chip in the label. |

Product Master Database

| | |
|---|---|
| GTIN (or product id) | The product identification number |
| Product Name | The product name |
| Product Image | One or many product images |
| Color, Size, ... | Color, size and other product attributes |
| Price | Product price |

(56) References Cited

U.S. PATENT DOCUMENTS

| | | | |
|---|---|---|---|
| 8,417,586 B2* | 4/2013 | Tischer | G06Q 30/06 705/26.1 |
| 8,533,053 B2* | 9/2013 | Brown | G06Q 30/00 705/26.1 |
| 2002/0016750 A1* | 2/2002 | Attia | G06Q 30/02 705/26.7 |
| 2003/0171962 A1* | 9/2003 | Hirth | G06Q 10/06315 705/7.25 |
| 2004/0195308 A1* | 10/2004 | Wagner | B07C 7/005 235/375 |
| 2005/0216505 A1* | 9/2005 | Chorley | G06Q 10/06 |
| 2006/0262180 A1* | 11/2006 | Robbins | B41J 3/01 347/257 |
| 2008/0226297 A1* | 9/2008 | Sinclair | G06K 19/086 398/139 |
| 2010/0082444 A1* | 4/2010 | Lin | G06Q 20/042 705/17 |
| 2010/0082485 A1* | 4/2010 | Lin | G06Q 20/12 705/44 |
| 2010/0250336 A1* | 9/2010 | Selinger | G06Q 30/02 705/26.7 |
| 2010/0250399 A1* | 9/2010 | Williams | G06Q 30/0601 705/26.1 |
| 2011/0060456 A1* | 3/2011 | Lowe | G06Q 10/06 700/237 |
| 2012/0059693 A1* | 3/2012 | Colodny | G06Q 10/083 705/14.1 |
| 2013/0346201 A1* | 12/2013 | Bilange | G06Q 30/0256 705/14.54 |
| 2015/0120534 A1* | 4/2015 | Cardwell | G06Q 10/0837 705/39 |
| 2015/0178792 A1* | 6/2015 | Carr | G06Q 30/0276 705/14.53 |
| 2015/0194030 A1* | 7/2015 | Davidson | G08B 13/248 340/572.7 |
| 2015/0310383 A1* | 10/2015 | Iser | G06Q 10/087 705/26.81 |
| 2016/0125500 A1* | 5/2016 | Wang | G06Q 30/0631 705/26.7 |

* cited by examiner

SYSTEM AND METHOD FOR MOBILE DEVICE SELF-CHECKOUT FOR RETAIL TRANSACTIONS WITH LOSS PROTECTION

RELATED APPLICATIONS

This application is related to and claims the benefit and priority of U.S. Provisional Application No. 62/204,619 filed on Aug. 13, 2015 and bearing the present title, which is hereby incorporated by reference.

TECHNICAL FIELD

The present disclosure is directed to systems and methods for asset tracking and self-checkout in a retail environment. Aspects of the disclosure relate to providing a transaction system and mobile device application interfacing therewith. Specifically, providing loss protection such as theft protection in a self-checkout retail transaction or similar transactions.

BACKGROUND

Retail stores are a staple of modern-day living. Physical brick-and-mortar stores employ a familiar, well-known layout with shelves and displays of merchandise occupying the bulk of the store and cashier areas near the front or exit. Consumer transactions require customers to produce selected items at a checkout location to initiate a purchase transaction. Item information gets entered into a point-of-sale (POS) terminal device, or the information is automatically entered by scanning barcodes on product packages with a barcode scanner. Customers are then offered various payment options—at least, historically—such as paying by cash, check, credit or debit card.

Strides have been made to expedite transactions, track inventory, and reduce theft. Mechanical cash registers have given way to POS terminals and electronic registers integrated with stores' electronic inventory databases. Universal Product Code (UPC), bar codes, Quick Response (QR) codes and similar markings designed for scanning by electronic (optical) scanners have become ubiquitous on packaging to allow for scanning by inexpensive scanners. Attempting to mitigate long lines and need for retail staff, self-checkout POS systems have been deployed in many retail stores.

Some have proposed more efficient systems for use in stores having self-checkout lanes such as grocery stores, home improvement stores and other retail box stores. A self-checkout-equipped POS typically includes a countertop and computer terminal, optical scanner or reader, a computer communication connection, and POS software running on the computer at the POS. The customer scans products upon checkout using the optical (e.g., bar code) reader. The computer communicates with the customer via the POS software and a user interface. The Universal Product Code (UPC) of the merchandise being purchased are scanned from each item individually and the corresponding information is processed for pricing and inventory control by sending the scanned UPC information to a host server, which processes the UPC information by comparing it to a database. The database typically includes information such as a description of the product, number of units in stock, price per unit, and any other information which may facilitate the transaction.

This approach has largely replaced older methods where a human cashier manually enters the price SKU code of each item into a cash register at the POS. However, one disadvantage of item tracking using the UPC scheme is that the code doesn't typically uniquely identify an item such as a serial number would.

One problem with self-checkout POS installations is the reduced monitoring of merchandise being checked out by customers, including the problem arising from customers who accidentally or intentionally carry out merchandise through a self-checkout POS without properly or fully scanning the merchandise (in other words without paying for it). For the present purposes, accidental and intentional omission of such a checkout procedure by a customer is considered an unwanted loss of the merchandise equivalent to theft or shoplifting. To address this, some installations have affixed tags to merchandise and inventory items for tracking and security controls. Magnetic and digitally encoded tags can be read by an active or passive transponder device operated by a retail associate for reducing shoplifting of expensive items from stores such as clothing stores.

Existing systems have limitations including, by way of example, the lack of security measures working in concert with the systems. All sales must be monitored by an attendant to insure that the patron has presented each merchandise item to the bar code scanner. The requirement for an attendant to monitor the sales limits the number of sales terminals that may be operated, as it is not cost effective to have an attendant monitoring such a terminal during periods of low sales volumes.

Alternatively, goods must be tagged with magnetic security tags which set off an alarm if they are not removed or disabled using a special machine prior to carrying the goods out of the store through a security gate. Security tags are commonly used on expensive goods such as clothing. The security tags are typically affixed to the clothing with a mechanical fastener that may damage or deform the goods being tagged. The presence of such security tags on merchandise also detracts from the customer's shopping experience as the tags are an awkward reminder that the retailer is concerned about shoplifting by its customers. Also, the tags can be bulky and awkwardly attached to items such as clothing, making it difficult to comfortably try on the clothing in the store. The security tags, tag removal or neutralization devices and associated security gates at store exits detract from the shopping experience and add cost of installation and maintenance to the store owner. In addition, existing anti-theft measures are imperfect and cause numerous false positive alarms which lead to customers and store associates alike ignoring the alarms or having awkward interactions if the customer's person needs to be searched because of the setting off of an alarm.

Self-checkout technologies have gained acceptance in some types of stores such as supermarkets, high volume retailers, and home improvement stores. Yet, many stores have found that employing self-checkout technologies does not avoid customers waiting impatiently in lines. As mentioned, most self checkout systems employ machines that are expensive, they occupy valuable space at the front of the stores, and there can only be so many of them available at one time. They are also prone to errors or security lapses if the retailer is unable to properly monitor the customers' operation of the self checkout stations.

A schema for marking and tracking commercial inventory is the electronic product code (EPC) schema. FIG. 1 is an exemplary partition table 100 and corresponding binary string 110 showing the contents of an electronic product code (EPC), according to the prior art, which is shown and further described for example at www.epc-rfid.info/sgtin as publicly available circa Aug. 10, 2015. An EPC code is therefore a standardized multi-bit number to identify certain information relating to an item of merchandise or inventory. EPC schema include 64, 96 and 198 bit schema. The EPC can encode a GTIN/UPC number and may also include a serial number for an item. A SGTIN (serial GTIN), the GTIN/UPC number identifies the type and manufacturer of an item (e.g., a merchandise product). Retailers and grocers and box stores commonly stock merchandise bearing labels or tags to permit more accurate and rapid "scanning" of the merchandise, whether for inventory or checkout purposes. One kind of retailer that has not benefited from self checkout technology includes high end boutique retail stores such as clothing, electronics or other boutique merchandisers. Such retailers do not wish to have common rows of checkout registers in the store or lining its exit ways as are found in box stores and grocery chains. One reason is that these checkout stands have a common and unwanted appearance. Another reason is that these checkout stands take up valuable floor space in the boutique retail store.

Other retailers (e.g., Apple Inc.) have introduced limited self help systems for their customers. Customers in Apple stores can select and pay for certain products using their mobile devices, which operate using an installed App and while connected to the store's wireless communication network or to another wireless communication network (e.g., 802.11, cellular network, etc.). However, these systems lack theft control means and therefore are limited to use with low-value products.

Other systems for tracking and processing inventory include Radio Frequency Identification (RFID) systems. Unlike bar code systems, in which the bar code must be directly displayed to the bar code reader or a camera, RFID systems use radio waves to read a tag anywhere within the field generated by the reader, regardless of the orientation of a particular tag.

RFID is a data collection technology that uses radiosensitive tags for storing data. RFID tags, which are also sometimes referred to as transponders, typically comprise two parts. The first part is an integrated circuit for storing and processing data, modulating and demodulating RF signals, and performing other specialized functions. The second part is an antenna that provides the means for the integrated circuit to transmit its stored data to an RFID reading device. An RFID reading device is also called an interrogator. In most applications, RFID tags are affixed to moveable inventory and act in a passive way, being interrogated by a stationary RFID reader.

Various merchandise-tracking solutions using RFID tags have been proposed as a substitute for using bar codes in supply chain management and, in particular, retail or supermarket type checkout systems. RFID tags can be read from up to several meters away, and RFID scanners are capable of multi-directional reading, allowing RFID tracking systems to scan for multiple items in the vicinity of the scanner.

Efforts to implement conventional RFID-based scanning systems include implementations for scanning an entire shopping cart full of items at once, in an effort to save time over the traditional checkout process where item bar codes are manually scanned in one at a time. However, difficulties have arisen in obtaining an accurate accounting of shopping cart contents, due primarily to the size and volume of a typical shopping cart. Items near the center of a cart are not reliably detectable with an RFID scanner using existing technology. Also, in a busy practical retail environment, if multiple nearby checkout stations are installed, the reader at one checkout station may accidentally pick up signals from RFID tags belonging to a customer at another checkout station, thereby charging the wrong customer for the goods and/or double-charging more than one customer for the same goods. Therefore, current applications of RFID technology (and similar RF tagging technologies) are not yet secure, economical or reliable enough to be confidently used in daily commerce.

Another limitation of RFID is it is not widely integrated onto mobile devices. Although there have been a few attempts to bring RFID reading technology into mobile devices like smartphones, this technology has not become a widespread industry norm, for example similar to a camera. This also limits advanced scenarios where the customer can read an RFID code with her mobile device, for example to purchase a good in a retail store.

Despite the shortcomings of prior RFID-based product scanning systems, however, RFID technology remains a powerful tool with a great deal of potential for use in supply chain management, inventory management, and, in particular, for risk management and theft prevention. Anti-theft devices, such as disposable anti-theft tags and anti-theft towers or pillars near store exits that sense them, have become more widespread. All of these technologies contribute to the smooth, efficient operation of retail stores for store owners and a more streamlined experience for consumers.

With respect to payment, credit and debit cards have been in use for years. The manner in which these payment cards are used is substantially unchanged since their introduction: a cardholder presents their payment card to a merchant, who uses a magnetic stripe reader to read the cardholder's payment account information and then the merchant transmits the payment account information along with transaction details to a payment network for authorization, clearing and settlement. While this approach has worked well, there are a number of disadvantages associated with it.

For example, not all merchants are able to properly secure the user information that is read from a payment card. There have been a number of highly publicized incidents where cardholder data was stolen from merchant systems. In other incidents, employees directly skimmed or copied cardholder data and used it for fraudulent transactions. If merchants are required to continue to read, store and transmit payment card information, such thefts will persist. Further, the systems and procedures required to properly save, store and transmit cardholder information is a significant cost to merchants. It would be desirable to provide systems and methods in which payment card information is not stored, captured, or transmitted by merchants.

Recently, payment card associations and issuers have offered payment solutions using mobile phone technology by proposing the use of near field communication (NFC) chips or tags installed on/in mobile phones as a way to allow payment card information to be presented at a point of sale location, the operable range of NFC systems being on the order of several centimeters. However, such solutions require that point of sale devices have NFC readers installed, and would still have the security (e.g., theft protection) problems described above.

SUMMARY

The present disclosure is concerned with processes for carrying and selling merchandise. In particular, this disclosure relates to the aspects of commerce involving the secure checkout of retail goods. According to the present disclosure, customers of retail stores can not only independently process their own checkout process, but also the store can safely allow customers to do so without the theft risks inherent in other self checkout systems. Therefore, the present invention discloses systems and methods for secure theft-resistant asset tracking, mobile device scanning and self-checkout in a retail environment. Some or all principles discussed here can be extended to other contexts aside from retail merchandise sales and POS transactions. For example, the movement of controlled substances, valuable resources, machines, persons or other things in a commercial, medical, industrial or other process can benefit from some or all of the techniques and systems described below.

Generally, the present invention causes the controlled updating or changing of a status of a RFID chip on a piece of merchandise in response to its proper purchasing by a customer in a self checkout scenario with a mobile device, regardless of whether the mobile device supports reading RFID. In particular, the invention changes the security flag of a RFID chip on a particular piece of goods responsive to communication between a customer's mobile device and the retailer's system indicating that the customer has bought (paid for, checked out) with regard to that piece of merchandise or that object if the context is other than a retail checkout scenario.

Aspects of the disclosure also relate to providing a transaction system using a mobile device application interfacing therewith.

Yet other aspects of this disclosure are directed to systematic incorporation of a tracking database and technological theft prevention means with scanning and payment options operable by a customer portable communication device (e.g., mobile smart phone), as well as practical methods for the application thereof and remedying these and/or other associated problems.

This disclosure provides an overview of the subject matter of the present invention. It is not intended to be an exclusive or exhaustive explanation of the invention as could be extended, applied or adapted by those skilled in the art. Further limitations and disadvantages of conventional and traditional approaches will become apparent to one of skill in the art, through comparison of such systems with some aspects of the present invention as set forth in the remainder of the present application.

Another machine-readable encoding scheme is the Quick Response (QR) coding scheme. QR codes have become increasingly popular in all product and service industries. Comprising a two-dimensional bar code, QR codes now are used in a broad context, including both commercial tracking applications and convenience-oriented applications aimed at mobile-phone users (termed mobile tagging). Presently, consumers can scan a product's QR code using their smart phones and receive detailed information regarding that product. Many mobile phone applications utilize this functionality for a variety of different purposes. Aspects of the present invention include the use of quick response (QR) codes and RFID identification—and incorporation thereof—to overcome the above identified shortcomings as well as others discussed later in the disclosure. Other aspects provide improved methods of item tracking that can greatly improve the shopping experience for customers and employees of brick-and-mortar stores, i.e., stores that serve customers in a building as contrasted to an online business, while offering a modernized shopping and payment process.

Still other aspects of the invention include containing and organizing selected goods to be purchased and methods of expediently checking out customers at the completion of shopping. In some aspects, the present concepts are useful in the context of shopping in a supermarket or department store wherein consumers have the capacity to self-shop and self-checkout even without access to a point-of-sale (POS) terminal. Thus, embodiments of the invention will be discussed below largely in the context of a retail store application. However, one skilled in the art having benefit of this disclosure will recognize other applications within the scope of the invention that involve supermarket shopping environments.

A particular embodiment is directed to a system for reducing a risk of loss of an article of merchandise from a retail establishment, comprising a plurality of labels adapted for securement to said article of merchandise, including an optical label encoded with an optical label identifier and a RFID label encoded with a RFID label identifier; a local processing machine proximal to said retail establishment, in communication with at least one radio frequency identification (RFID) reader in said retail establishment; a cloud-based server coupled to a data store disposed remotely from said retail establishment, said cloud-based server in communication with said local processing machine over a communication network and receiving from said local processing machine information indicating at least said RFID label identifier; said cloud-based server further in communication with a mobile communication network so as to receive, from an optical scanner-equipped mobile device in said retail establishment, information indicating said optical label identifier; and said cloud-based server being configured and arranged to indicate a sale state of said article of merchandise and to alter said data store to update the same to reflect the sale state of said article of merchandise.

Another particular embodiment is directed to a method of reducing a risk of loss of an article of merchandise from a retail establishment using a server in communication with a network, the method comprising affixing to said article of merchandise a plurality of labels including an optical label encoded with an optical label identifier and a radio frequency identification (RFID) label encoded with a RFID label identifier, said optical label readable by an optical reader or scanner and said RFID label readable by a RFID reader or scanner; recording said optical label identifier, said RFID label identifier and information regarding said article of merchandise in a data store accessible by said server so that said article of merchandise is associated with said optical label identifier and said RFID label identifier; receiving from a customer mobile device equipped with an optical label reader or scanner, said optical label identifier; querying an item data store using said optical label identifier to determine if the article of merchandise associated with said optical label identifier is available for sale; transmitting product information to the customer mobile device, over said network, if the optical label identifier for the article of merchandise is found in said item data store and the article of merchandise is available for sale; receiving from the customer mobile device, over said network, information enabling payment for the article of merchandise so as to affect a sale of said article of merchandise; updating said item data store to reflect that the article of merchandise is sold; and with an exit RFID reader in communication with the item data store, determining whether to activate a security alert when the article of merchandise enters a read range of the exit RFID reader.

BRIEF DESCRIPTION OF THE DRAWINGS

For a fuller understanding of the nature and advantages of the present invention, reference is made to the following detailed description of preferred embodiments and in connection with the accompanying drawings, in which.

Figure 1:
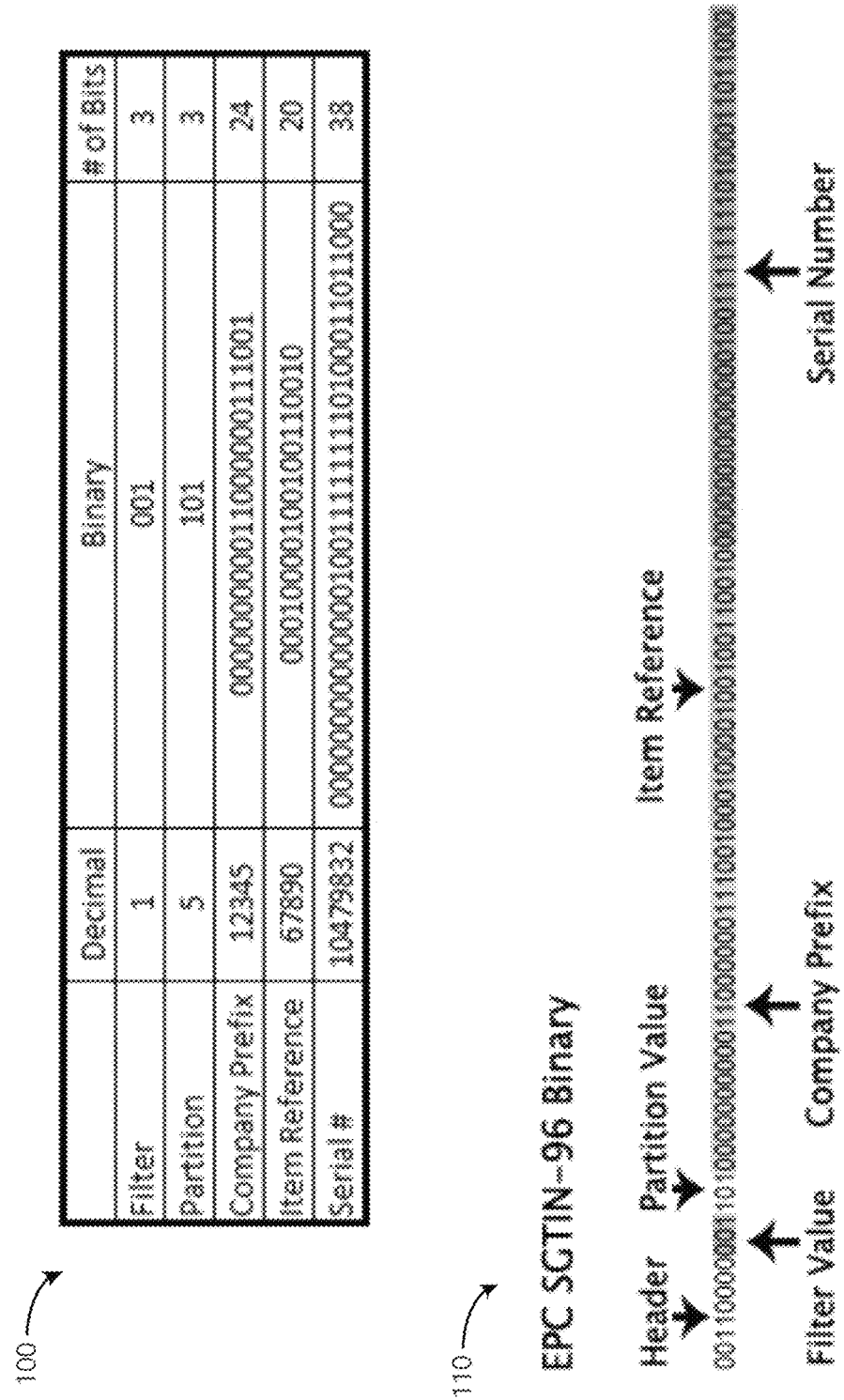
FIG. 1 is an exemplary table and corresponding binary string enumerating the contents of an electronic product code (EPC) according to the prior art.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

DETAILED DESCRIPTION

Current self checkout systems suffer from a number of shortcomings as discussed above. The present system and method overcomes some or all of said shortcomings in an efficient and practical scheme that can be implemented in a variety of situations. One implementation is in commercial retail stores where goods are labeled and tagged with unique identifying information readable by one or more readers or scanners operating in concert on a mobile device of a customer (shopper) in communication with a retailer computer (server). The overall result is a streamlined self check-out that avoids concerns of theft of the goods from the store. The system and method are therefore economical, secure, private and operate more quickly and enjoyably than current associate-assisted or conventional self checkout means. While the retail store example is offered here as a typical or illustrative application of the present concepts, those skilled in the art will appreciate that these concepts can be applied to controlling and tracking and securing other things in other contexts as well, all of which are comprehended by the present application and claims.

One embodiment of the invention provides an improved system and method of shopping at brick-and-mortar stores such as department stores, specialty retailers and boutique retailers. The customer selects items available for sale while the customer shops. The customer is allowed to employ his or her mobile device (e.g., smartphone) with suitable application or "App" software thereon to conduct an unassisted purchase transaction. In an aspect, the present invention saves time and money by eliminating the need to have an employee (store sales associate) conduct or supervise the sale at a POS checkout station, while simultaneously providing theft protection of the merchandise. Each item selected by the customer is pre-labeled with a QR code and an RFID tag, both of which uniquely identifying the item. Installed software and hardware on the customer's mobile device allow several key functions to enable the present transactions. The customer's mobile device is typically equipped with an optical scanner such as a camera. The camera hardware and software on the customer's mobile device can record the printed label (e.g., QR code or similar optical label) on the goods to be purchased. The mobile device can also wirelessly communicate, directly or indirectly, with the retailer server through any wireless communication network including a local area network, 3G, LTE, or other cellular communication type network. In an embodiment, the mobile device communicates directly with a wireless transceiver in the retail store. In another embodiment, the wireless device communicates with a wireless transceiver (e.g., a cellular data network) belonging to a third party or to a cellular communications infrastructure.

In another aspect, the retailer offers a special App (small application software program) that runs on the customer's mobile device to more particularly optimize the current transaction and provide a convenient user interface and other information to the customer.

The customer can pay for and conclude the sale transaction (checkout) by scanning the QR code affixed to the goods. The QR code of the goods being purchased is exchanged from the mobile device to the retailer's system (e.g., a local or remote retailer server) and the retailer's system is coupled to a database with identifying information, pricing information and other payment execution software to charge the customer's account as necessary, similar to systems found in ecommerce systems. Those skilled in the art will appreciate the various means for conducting mobile electronic payment, which are all possible under the present method. The store's system can respond to the self checkout sale transaction by inactivating or killing or disabling a security label on the particular goods purchased as will be described in more detail below. If the checkout procedure is concluded properly, the disabled or inactivated security label on the goods will not set off an alarm and the customer can carry the goods out of the store without incident. On the other hand, if the customer does not properly checkout and pay for the goods the store's security alarm could sound or alert a store employee to a problem or a crime, e.g., if an article of merchandise that is not properly sold passes an electronic check point in the retail establishment. In an aspect, the security labels comprise RFID tags affixed to the goods and uniquely tagging the same. A database of said RFID tags is kept by the retailer (locally and/or remotely) and can assist in inventory management as well as the present security and theft control function.

Several implementations of the store hardware and software infrastructure are possible with the present invention. In one example, the store can operate traditional-looking checkout POS stations. In another example, the store can use hidden embedded sensors, transponders and circuits on the premises to coordinate the checkout and security steps mentioned herein but without using conventional checkout stations.

The present invention exploits standard mobile device hardware technology and the present software and architecture to achieve a robust system which permits in-store shopping using a consumer's mobile phone through which items can be purchased. Software applications for smart phones and other mobile devices, otherwise known as Apps, have been developed to be able to photograph QR codes and then decode the associated number. These barcode-reading apps can query a database through a wireless connection to a network in order to look up the product associated with the barcode and securely begin the purchase process.

In such stores, each individual item sold has a label or a tag printed or affixed to it, which contains an RFID chip and has a QR Code printed on it into which the EPC for the merchandise is encoded. This means that the EPC can be read either with an electromagnetic RFID reader or by optically scanning the QR code, both of which identifies the item in the following manner.

Figure 2:
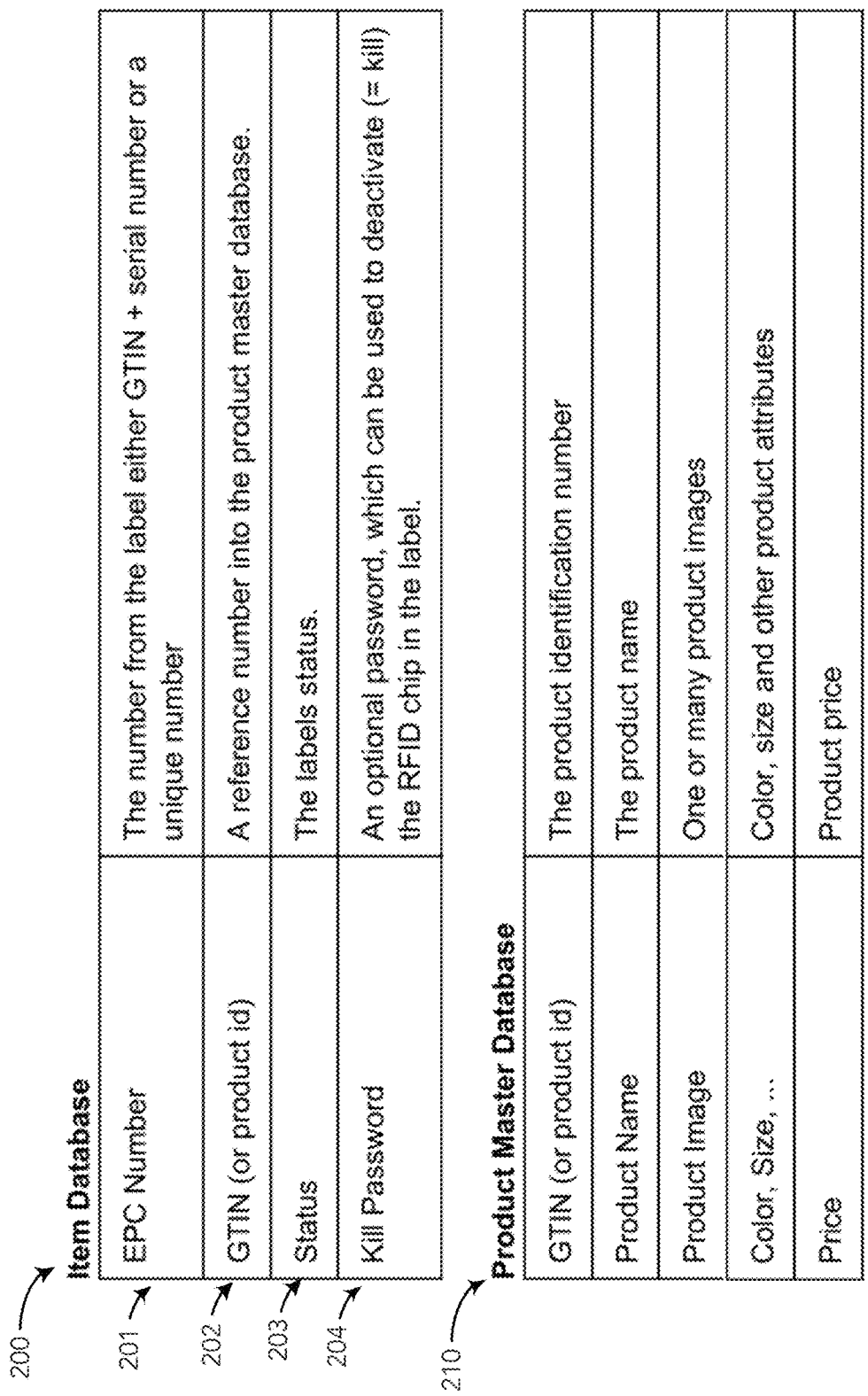
FIG. 2 depicts exemplary tables describing the contents of item and product master databases, in accordance with some embodiments of the disclosure provided herein.

FIG. 2 depicts an exemplary Item Database 200 and Product Master Database 210. Databases 200, 210 can be used to serve a variety of purposes throughout the hierarchy of the commercial supply chain and are presented merely for the sake of illustration according to an embodiment hereof. Those skilled in the art may devise equivalent embodiments for storing similar information in a computer storage medium and/or for transmission between electronic or computerized components.

In an example, suitably configured mobile phone Apps can access data associated with the Product Master Database 210, e.g., by scanning a QR code, to receive more information about a product. The Product Master Database 210 in this example comprises a GTIN 202 (unique product ID), product name, one or more product images, product retail price, color, size and other attributes of a product.

Item Database 200 in this example includes information more specific to uniquely identify an item which is helpful in loss prevention such as prevention (or reduction of the risk) of theft. The Item Database 200 contents may comprise an EPC number 201, GTIN 202, Status 203, and Kill Password 204. The Item Database 200 can also include a Retail Store Id 205 (not illustrated).

As discussed, the GTIN 202 specifically identifies the type and class of product. Whereas, the EPC Number 201 comprises the GTIN 202 and a serial number which uniquely identifies the item and may or may not be the same as the manufacturer's assigned serial number typically found on higher-end goods.

The Kill Password 204 is an optional string which can be used to deactivate ("kill") a RFID or similar chip, the chip being embedded in or affixed to merchandise, e.g., on the label of clothing goods.

The Retail Store Id 205 is a reference number to the retail store where the product is presented on the shop floor and is available for sale. The Retail Store Id 205 is only assigned a value if the item is in the status SALE (see below).

As the Item Database 200 tracks all EPC label numbers, a label can be placed in different states which are denoted by the Status entry 203 in the item database array, as follows:

INACTIVE (not in the database): In this state the label was produced by the manufacturer and wasn't yet assigned to a particular item. The label might be already physically attached to the product but wasn't captured in the item database and wasn't linked to a product in the product master database;

ACTIVE: In this state the label was attached to an item and was registered in the item database but not yet available for sale and is linked to an entry in the product master database;

SALE: The item is placed in the retail store and is available for sale.

SOLD: The item was purchased; and

KILLED: The theft protection system has recognized the EPC number, has acknowledged that the item was sold and has "killed" the chip (password based killing).

Figure 3:
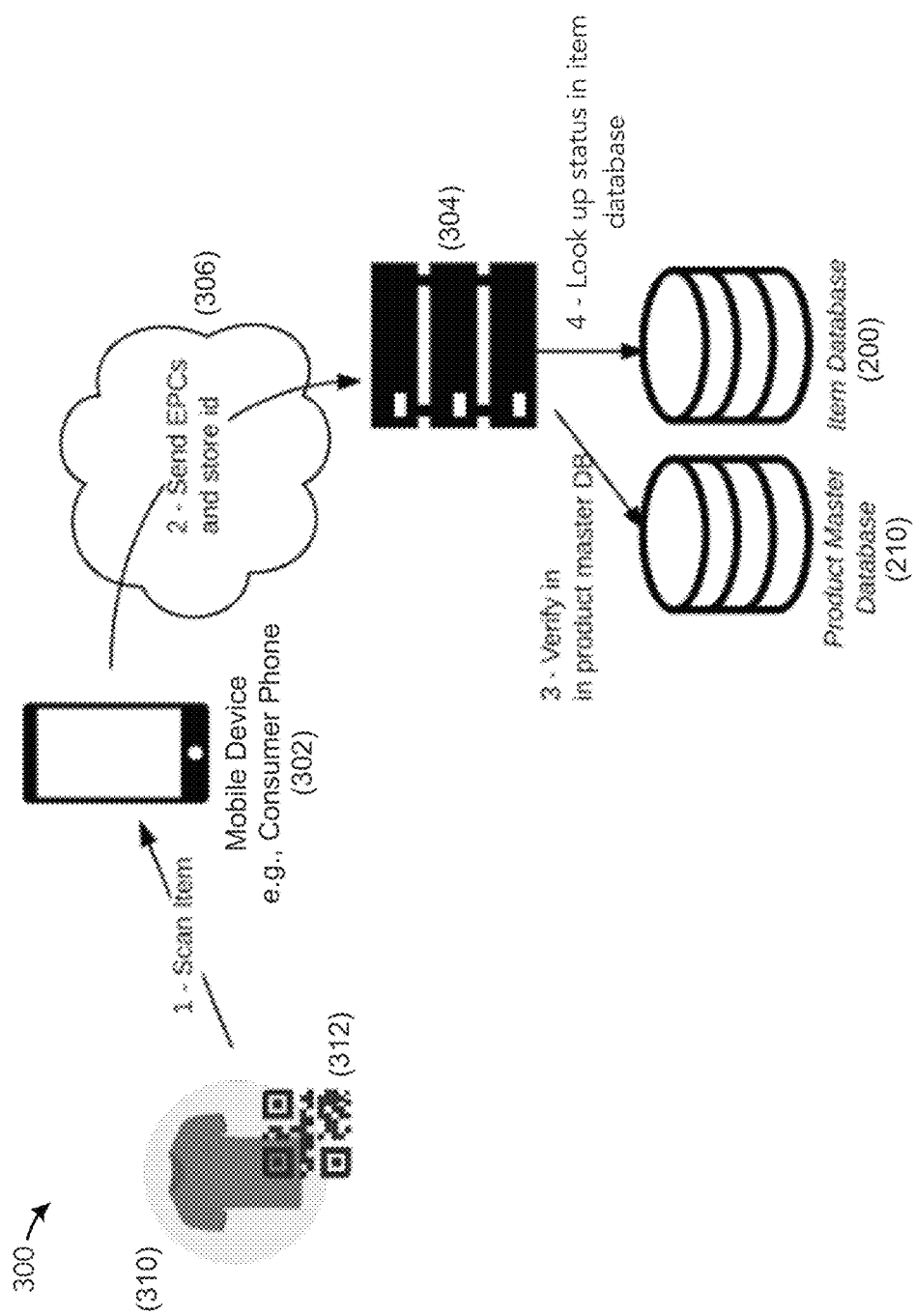
FIG. 3 is a diagram illustrating the initiation of a product purchase using quick read (QR) code and mobile phone in electrical communication with server side item and product master databases, in accordance with some embodiments of the disclosure provided herein.

FIG. 3 depicts an exemplary architecture and process for initiation of a product purchase using quick read (QR) code 312 and a mobile communication device 302 such as a cellular smartphone in communication with server side Item Database 200 and Product Master Database 210, described earlier. In the example shown, a purchase commences when a consumer uses a provided user (consumer) App on his or her mobile device 302 and scans a product's attached code. The attached code on the product 310 may be a QR code 312 which is optically scanned at step 300-1 by an optical sensor or camera on device 302. The user App transmits the EPC code and store ID at step 300-2 to a server 304 or cloud network 306. The Store ID can be determined either by global positioning system (GPS) information, or through other indoor or outdoor location technologies, e.g., using Beacons, Bluetooth® or as manually entered by a consumer or provided to user Mobile Device 302 by another device. In other words, any suitable self-location means or store identification procedure is not beyond the scope of the present invention.

Verification of entry in the Master Product Database 210 is performed by extracting the GTIN 202 from the transmitted EPC code at step 300-3. The item Status 203 can be accessed from the Item Database 200 at step 300-4, either concurrently or sequentially in time. It is noted that other steps can be combined with the exemplary steps above, and that steps can be carried out in any order as required by a given implementation.

Figure 4:
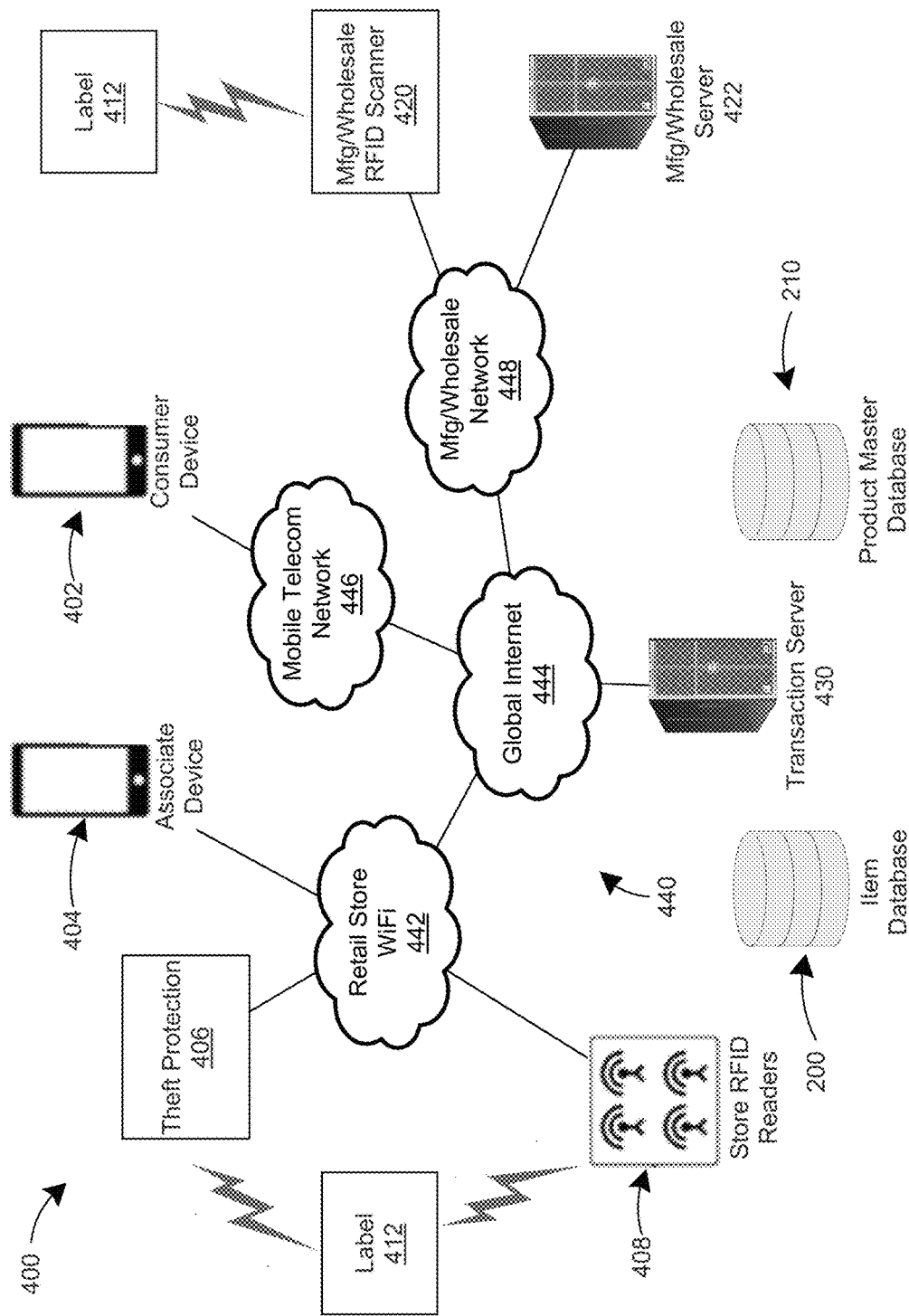
FIG. 4 is an exemplary mobile device self-checkout system with theft deterrence, in accordance with one embodiment of the disclosure provided herein.

FIG. 4 shows an exemplary arrangement in a system 400 implementing one or more embodiments of the present invention. A mobile user device 402 such as a smartphone can be used for self-checkout in the context of the user buying a product in a retail store environment. The system 400 comprises a theft protection module 406, one or more optional store RFID readers or similar devices 408, a connection to one or more networks 440 (e.g., the Internet), a sales associate's mobile device 404, QR code/RFID labels 412, manufacturer/wholesaler RFID scanner 420, an optional manufacture/wholesaler server 422, transaction server 430, and the aforementioned Item and Master Product Databases 200 and 210, respectively. The networks 440 include retail store Wi-Fi 442, Internet 444, mobile telecom network 446, and manufacturer/wholesale network 448. It is noted that several optional elements are depicted for comprehensive purposes. It should be understood that other implementations beyond the particular recited examples are possible and would be apparent to one of ordinary skill in the art upon review of the present disclosure. The components of system 400 can be combined or discrete in their physical design, as appropriate, with some components being co-located if appropriate (e.g., in a same computing hardware box) or separated apart. Also, appropriate software and computer readable instructions and code are typically programmed onto memory modules in the components carrying out processing instructions using conventional processing or custom processing circuitry. The choice of circuitry and program instructions to execute on such circuits is a matter of design choice. Similarly, the type of network 440 used for communication among the nodes can vary as needed for a particular implementation.

In operation, on the retail side, the theft protection module 406, the store RFID readers 408, and the associate mobile device 404 communicate with one another through the transaction server 430. For example, a message or communication from theft protection module 406 to associate device 404 passes through the retail store Wi-Fi 442 and the Internet 444 to the transaction server 430 where the message is logged and processed. The transaction server 430 then sends a new message (or forwards the original message) to the associate device 404 through Internet 444 and retail store Wi-Fi 442.

On the manufacturer/wholesaler side, the manufacturer/ wholesaler RFID scanner 420 communicates with the manufacture/wholesaler server 422 (and vice versa) via manufacturer/wholesale network 448.

In addition, the manufacturer side can communicate with the manufacturer/whole side. For example, the transaction server 430 can communicate with the manufacture/wholesaler server 422 via Internet 444 and manufacturer/wholesale network 448 (and vice versa). Through this connection, the transaction server 430 can receive initial unique product identifiers and/or EPC numbers from the manufacture/ wholesaler server 422. The transaction server 430 can store these identifiers in Item Database 200.

Figure 5:
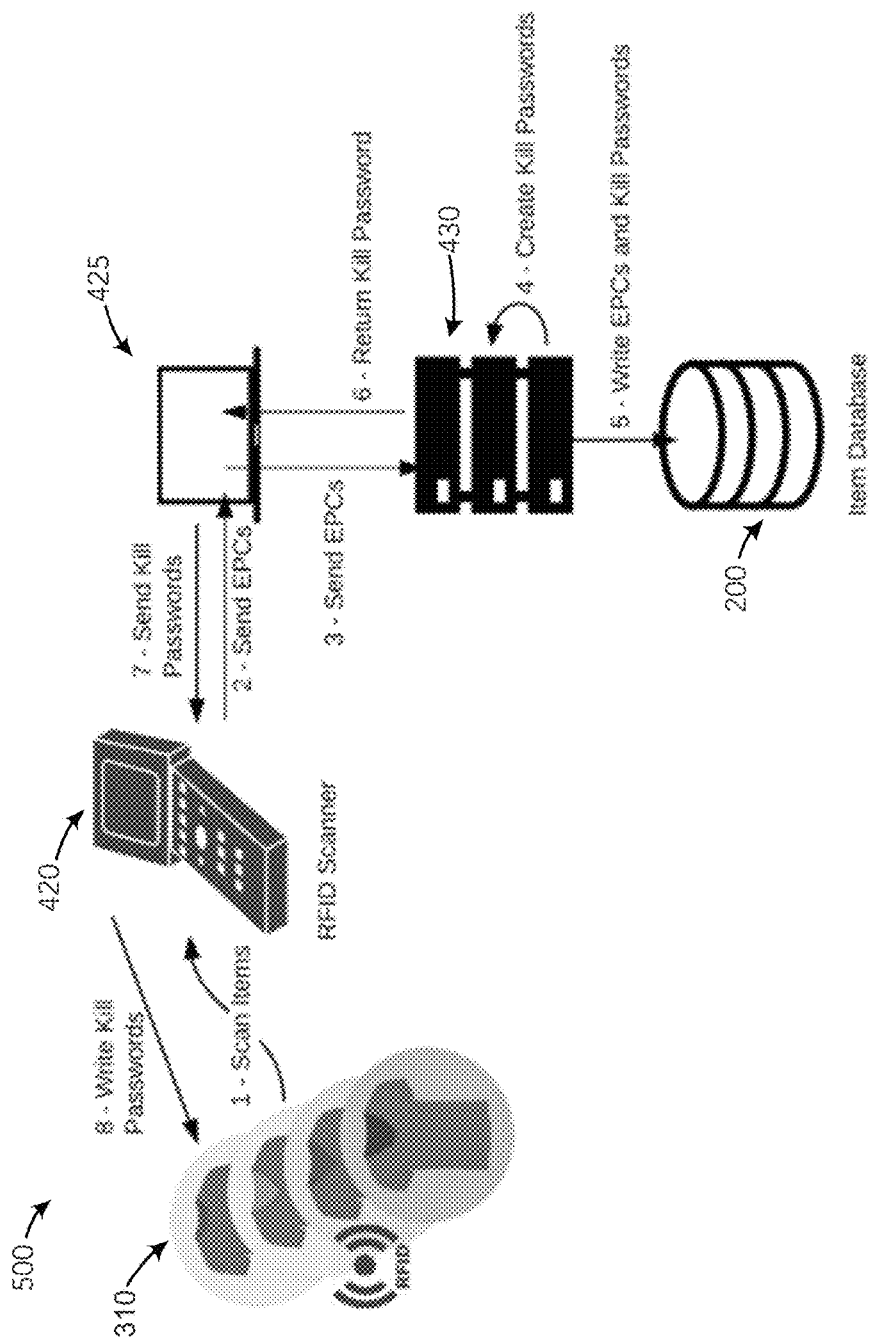
FIG. 5 is a diagram illustrating an exemplary process for the introduction of RFID theft tagging data into the mobile device self-checkout system, in accordance with some embodiments of the disclosure provided herein.

FIG. 5 illustrates an exemplary application of the present invention in the context of a process for the introduction of RFID anti-theft labeling data into the mobile device self-checkout system. In general, Item Database 200 entries are populated at the manufacturer/wholesale at step 500-1 using a RFID scanner 420. A user at a manufacturer or wholesale location makes entries for all items 310, which have labels attached but are not captured in the Item Database 200 at steps 500-2 and 500-3. The scanner 420 reads all label numbers and adds them with the State "ACTIVE" to Item Database 200 via a network connection or through a computer 425 connected to a network. The Server 430 also generates and assigns a unique KILL Password at step 500-4 to all RFID labels and stores the password in the item database at step 500-5. The Server 430 returns the KILL Password at step 500-6 via network connection or computer 425 to the scanner 420, which writes the Kill Password to the label.

Because the EPC number contains a number for the item type, the RFID scanner 420 has access to the item type and can link the item number with the aforementioned Product Master Database 210. Some manufacturers already equip products with a RFID label to track items along the whole supply chain. In that case, then the EPCs from this product can be also directly imported into the Item Database 200.

Figure 6:
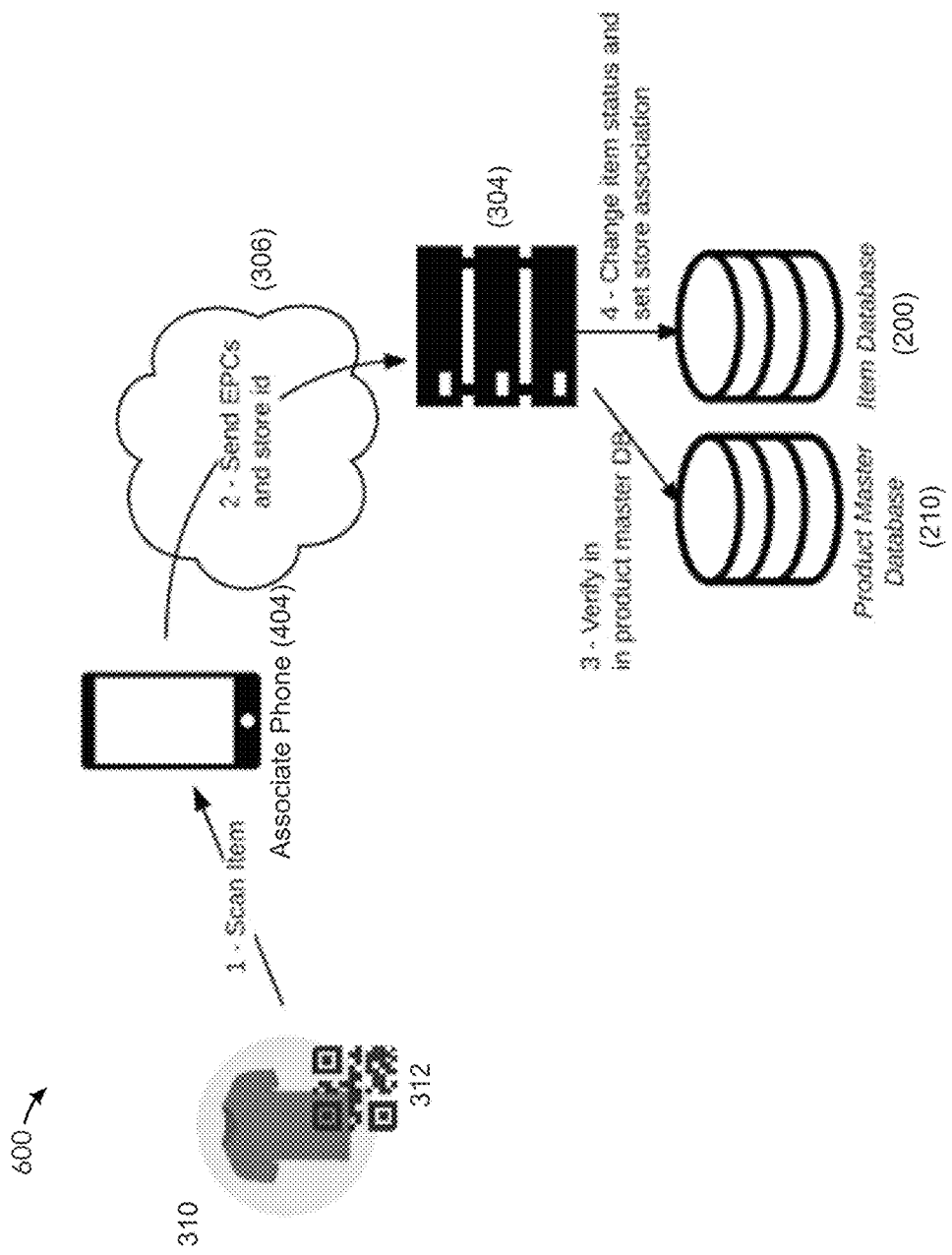
FIG. 6 is diagram illustrating an exemplary process for the introduction of EPC/QR data into the mobile device self-checkout system, in accordance with some embodiments of the disclosure provided herein.

FIG. 6 illustrates an exemplary architecture and process 600 for the introduction of EPC/QR data into the mobile device self-checkout system in accordance with some embodiments hereof. At the retail level, a user in a retail store places all items from a shipment near an RFID reader antenna. The RFID reader reads the label numbers at step 600-1, verifies that all are in the State "ACTIVE" and then updates their state to "SALE". The RFID reader also writes the Retail Store ID 205 into the Item Database 200, which identifies the store in which the item 310 is for sale. The Retail Store ID 205 can be entered manually or can be determined automatically with GPS or Bluetooth Beacon positioning or similar technology. In an alternative embodiment, a store associate can pick up each item 310 individually and optically scan the QR Code with a smart phone 302 running a suitable App program thereon. The associate's mobile device 404 then verifies the State of the product 310 in the Item Database 200 and then updates the State to "SALE" in the Item Database 200.

In one embodiment both steps (adding an item to the Item Database 200 and enabling it for sale) can also happen at the retail store. Separating these two steps in some embodiments allows improved exception handling, for example, if an associate in the retail store forgets to activate an item for sale, it is already known in the Item Database 200.

Stated otherwise, an item 310 bearing a label 312 is scanned at step 600-1 using an associate mobile device 404 equipped with an App for such scanning as described herein. At step 600-2 the scanned information and related data is sent through a cloud network 306 to a transaction server 304 and coupled databases 200, 210. The product information is confirmed in the Product Master Database 210 at step 600-3. The product's item Status and retail store information are updated in the Item Database 200 at step 600-4.

Figure 7:
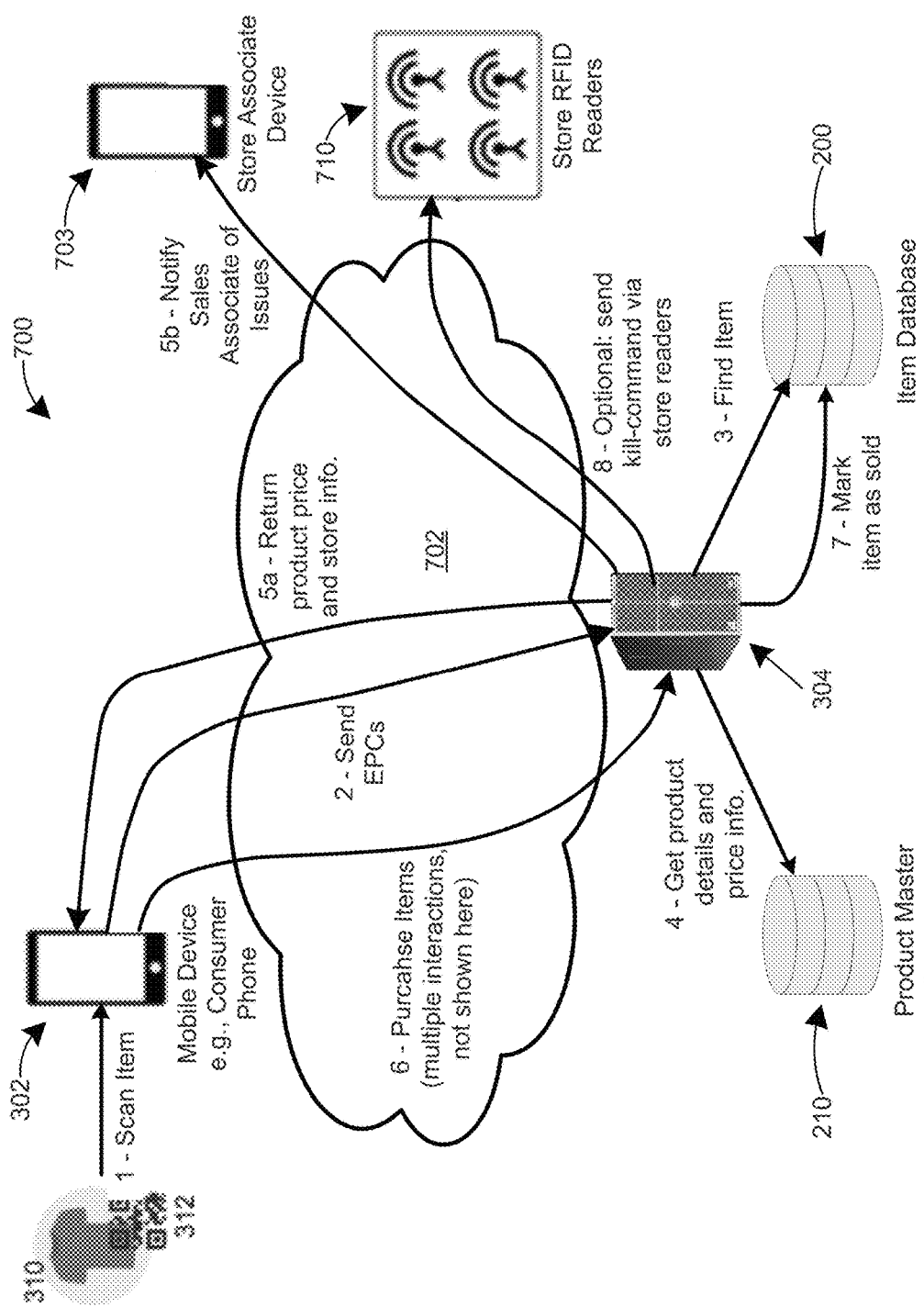
FIG. 7 is an exemplary self-checkout system with theft deterrence and corresponding flowchart of a product purchase using quick read (QR) code and mobile phone in electrical communication with server side item and product master databases, in accordance with one or more embodiments of the disclosure provided herein.

FIG. 7 illustrates an exemplary self-checkout system 700 with theft deterrence and corresponding process of a product purchase using quick read (QR) code 312 and mobile consumer phone 302 in communication with server side Item Database 200 and Product Master Database 210, in accordance with one or more embodiments of the invention. Most smartphones currently do not support reading RFID chips. Instead of reading the RFID chip, a customer optically scans with her smartphone device 302 the QR code 312 on merchandise 310. The information encoded in the QR code can contain the same EPC code as stored on the RFID chip, and the further processing is equivalent to processing with the RFID chip.

After scanning the QR code 312 at step 700-1, the EPC code in the QR code is sent over cloud network 702 at step 700-2 and is used to lookup the item in the Item Database 200 at step 700-3. If the item is not in the state "SALE" an exception (e.g., a message is sent to contact a sales associate) is raised on the Store Associate Device 703 at step 700-5b. An alert or message can also be presented on the Customer Device 302 to inform the customer that there may be an issue with the scanned item. If the item number is not known in the Item Database 200 and is not related with any product the retailer sells (check item type of EPC number with master product database 210 at step 700-4), a message will be shown to the consumer on the Consumer App running on the Consumer Mobile Device 302 that this is an unknown item. If the item is related to a product that the retailer sells, as discussed below, an alert or message can be presented on the Customer Device 302. If the item is in the state "SALE", the Consumer App communicates with the Transaction Server 304 to retrieve detailed product information (Step 700-4), product price and promotion information, which is then shown to the consumer at step 700-5a.

The consumer can then buy the item 310 at step 700-6 comprising the steps of providing payment information and receiving a receipt in the Consumer App or via email. In an embodiment, these steps are managed by the Consumer App and the Transaction Server 304. As one of the last steps the Transaction Server 304 marks the item 310 as "SOLD" at step 700-7 in the Item Database 200. In another embodiment, the method of checkout reiterates the preceding for a whole bag or cart full of items.

In one or more embodiments, the checkout can be facilitated by a retail sales associate. The method would be similar to the consumer's self-checkout; however, the sales associate might have access to an RFID reader 710 and would read the RFID chip instead of scanning the QR code 312.

In step 700-8, a KILL Command is sent to deactivate the RFID labels in the purchased items. The KILL Command can be transmitted via an RFID antenna in the store. In an alternate embodiment, a data store with which the RFID labels are registered may be updated to indicate a proper sale of merchandise, which then causes a security apparatus at a retail store to be desensitized to, or to ignore a RFID label associated with a sold piece of merchandise. The security apparatus can thus not be triggered (e.g., an alarm is not activated) when a RFID label for a sold piece of merchandise is detected or leaves the store. This way, even less sophisticated RFID labels that do not support a KILL command could be used.

As mentioned, a product or merchandise carries both an optical tag or label as well as a RFID tag or label. The optical label may be encoded with a unique ID number identifying the optical label (and hence the merchandise to which it is attached). Also, the RFID label may be encoded with a unique ID number identifying the RFID label (and hence the merchandise to which it is attached). In an embodiment, the ID numbers on the optical and on the RFID labels are the same, which can be accomplished by an entity that manufactures both the optical and RFID labels so they are sold as pairs, or this can be accomplished in another manner. In another embodiment, the unique ID number on an optical label can be different from the unique ID number on a RFID label, but the respective optical and RFID label numbers are mapped to one another in a lookup table or database so that they can be associated with one another and correspond to the same piece of merchandise to which the two labels are affixed.

Figure 8:
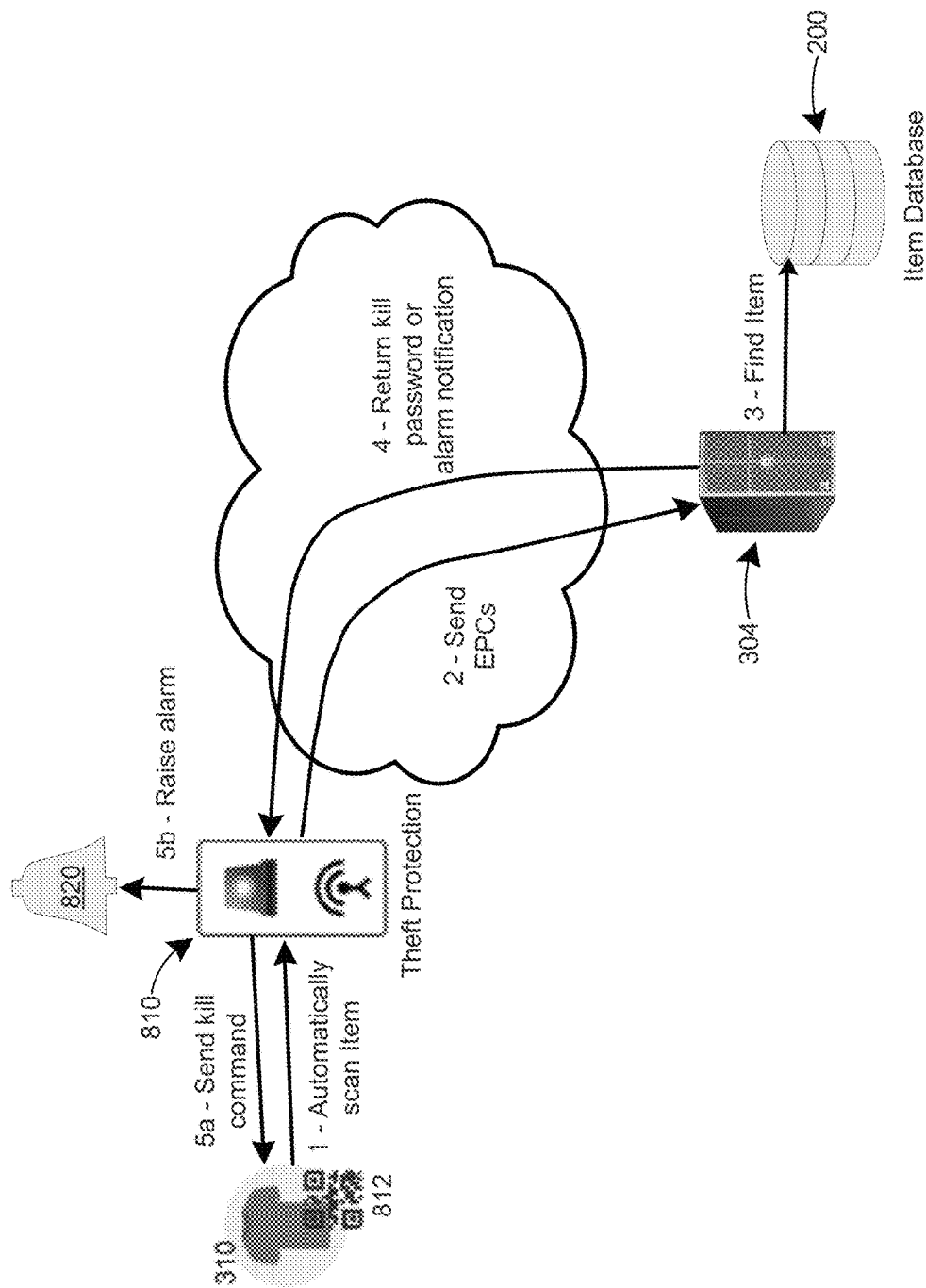
FIG. 8 depicts an exemplary process of the use of RFID theft tagging in practice within self-checkout system, in accordance with some embodiments of the disclosure provided herein.

FIG. 8 illustrates an exemplary process 800 for the use of RFID theft labeling in practice within a self-checkout system. In one embodiment of theft detection, the retail store has special exit readers installed. Exit readers act as theft protection "walls" or electronic boundaries in retail stores, and include RFID readers with special antennas that only read RFID labels in a well-defined range and direction and not from the whole retail store environment. Therefore, the present labels are active or operable within a pre-determined general range so that they activate a response to the passage of the labels (which are affixed to goods) when the goods 310 carrying the labels 812 are proximal to or within the pre-determined range. In some embodiments the range is a relatively short range such as 5 meters or less, in other embodiments the range is 1 meter or less.

When the consumer leaves the retail store carrying goods 300 and passes near these RFID readers, the exit reader 810 automatically reads or scans the information from all labels in the consumer's shopping bag or cart at step 800-1.

The reader then sends the scanned EPC or similar numbers at step 800-2 to a Transaction Server 304, which checks all item (EPC or similar) numbers against the Item Database 200 at step 800-3. If all items are in the state "SOLD," no alarm is raised and a KILL command and/or password is retrieved from the Item Database 200 and sent back at step 800-4, which is transmitted to neutralize an active label at step 800-5a. This last step 800-5a is optional and the system would also function if the label is not neutralized with a KILL command. If an item is in the state "SALE" or "ACTIVE", an alarm is raised at step 800-5b, which can be set off by alarm unit 820 locally at the store, at a store security location, on an Associate Device, at a remote server, including any or all of the above. If the item's number is unknown in the Item Database 200, which happens for example for items in the state "INACTIVE," but the item's number is related to a product the retailer sells (e.g., by checking the item type part of the EPC against a Master Product Database), then an alarm can also be raised. This last scenario indicates a situation where the item was not properly registered with the Item Database 200. This is still a theft situation because with the described checkout flow a customer would not be able to checkout an item in the "INACTIVE" state. Therefore, the customer must have attempted to walk out of the store without paying for the item. An unknown label is also detected when the customer is carrying a product purchased at another retail brand into the store. In that case the EPC code most likely indicates a product not sold at this retail store and the product would be not found in the product master database and no alarm would be raised.

To avoid false alarms or improve the performance and accuracy of the system, there can be label readers or sensors placed in various locations of a retail store, which readers or sensors can detect that a labeled merchandise is moving towards a POS or store exit. This can allow for some advance warning to associates or automated systems to anticipate the checking out of the merchandise in motion as it travels within the store towards the store exits.

The time for reading and potentially writing to the RFID chip should be very short because of the time it takes for a consumer to walk out of the door. That time frame is preferably sufficient for reading and writing (that is, killing the label). If writing is not possible, reading is sufficient because the item is marked as "SOLD" in the database.

Another factor addressed in some or all embodiments is the latency to access the item database. To reduce latency all items sold in a particular retail store could be replicated into a small (local) database within or close to the label reader. That small (local) database would preferably only store the unique item numbers of the items of interest at that location. If that still isn't sufficient, the RFID reader could be mounted in a special "exit device" or checkout pad. A consumer holds all self-checkout items or the bag or cart containing these items in front of an "exit device" (theft protection) until a green light approves the purchase and indicates proper completion of the checkout transaction.

In another embodiment, RFID KILLS are sent through storewide RFID label readers. Retail stores can be equipped with an array of RFID label readers, which can be logically distributed throughout the store and its infrastructure at known positions. These RFID readers may be installed below the ceiling and can read with their antennas all items on a shop floor. In the context of the present invention, KILL commands could be sent out by these storewide antennas when a customer purchases an item. The transaction server would then relay a KILL command to the store and its RFID antennas which then sends the actual KILL command to a label. The exit reader (as described above) could then in a basic form just read RFID and if one is detected, which matches the UPC code the retailer sells, raise an alarm. No database check would be necessary in this instance.

In yet another embodiment of theft detection self checkout process, only store-wide label readers need be used. If the retail store is equipped with store-wide label readers, these readers can be also used to detect a potential theft. These store wide readers can typically calculate and approximate position of an item in the store, for example, a specific shelf. This capability can be also used for theft protection. A specific zone on the shop floor is defined as an exit zone. The RFID label readers know the approximate position of every item and can detect items within the exit zone and check their status in the item database as mentioned earlier.

In one embodiment, returns are handled in the following manner. When a consumer returns an item to the retail store, the sales associate checks the item and places it back on the shop floor for sale. If the item still has the label attached and the label's RFID check wasn't "KILLED" (see above), then the item state can be reset in the item database from "SOLD" to "SALE." But if the label was removed or the RFID chip was "KILLED," a new label must be issued.

One option is to have a RFID label printer in the retail store, which writes the necessary information on the blank RFID chip in a blank label and prints at the same time a QR code with ink on the label. But RFID label printers are expensive and it may not be feasible to place these expensive devices in all retail stores just for handling the return process. In an alternate embodiment, a pre-produced generic label can be attached. These pre-produced generic label would contain an EPC as well and can be used to identify the vendor or retailer, but it has a special item type number. The serial number, which is part of the EPC, is an arbitrary number but unique across all replacement labels from this vendor or retailer. These special item type identifies it as a replacement label. A sales associate just needs to attach such a pre-manufactured label to the item, then scan the label and assign it to a product in the master product database 210 and activate it in the item database 200. That way the item is associated with a product type, price and all other relevant product information. It is noted that if labels are lost or are broken, a similar process using generic labels can be used in the retail store.

The self-checkout process for an item with a replacement label essentially works the same, except that the EPC number itself no longer identifies the item type (product) anymore.

Other features and services that can be provided by the present system and method include the following:
- a consumer scans a label, which is not active causing a message to notify a sales associate;
- a consumer scans a label again after an item is sold causing a message that the item is sold;
- a consumer walks with an item bearing an old label (for example from a previous purchase) through the theft protection or POS or exit zone. Here, if the label was killed, then the action is ignored; if the label is still in the Item Database and in a "SOLD" state, then the action is ignored; if item type in the Product Master Database, but is at its end-of-life, then, again, the action is ignored; in all other cases an anti-theft alarm is triggered.

In yet another embodiment, labels are pre-manufactured only with a unique number or ID information. The label would not need to contain any other information about the manufacturer or the product type. Such labels would be inexpensive to produce because they do not require customization and inclusion of more elaborate data fields. Such labels can also be distributed to retail stores and warehouse for ad hoc use, that is, if a label is broken, removed from merchandize or for a product is returned without its original label.

In some embodiments where labels without the KILL password feature are used or if the theft protection system is not set up to "KILL," the process can be implemented slightly differently. The item is still marked as "SOLD" in the Item Database and will be correctly classified by the theft protection device as sold item. But which each item sold, the Item Database will grow over time which may not be preferable in some cases. As a solution, the label Status is stored only for a limited amount of time, e.g., for a few years, as it is expected that a consumer removes the label because he or she wants to wear or use the purchased item. The item is thus no longer expected to return to circulation. To limit the required database size, a purge policy may be implemented to remove all "SOLD" entries older than a pre-determined age (e.g., number of years) from the database, for example older than two years.

For items with manufacturer issued serial number (e.g., expensive handmade products or electronic products like mobile phones), the serial number could be also stored on the label. In that case serial number part of the EPC and the serial number on the item would be identical. However, this is not required for all embodiments of this invention. Instead of storing the serial number on the label, the item's serial number could be also stored in the Item Database. The label would then identify an entry in the Item Database, and from there the serial number can be retrieved. A lookup table correlating each label ID can thus be associated with a corresponding unique serial number of the item for that label.

Figure 9:
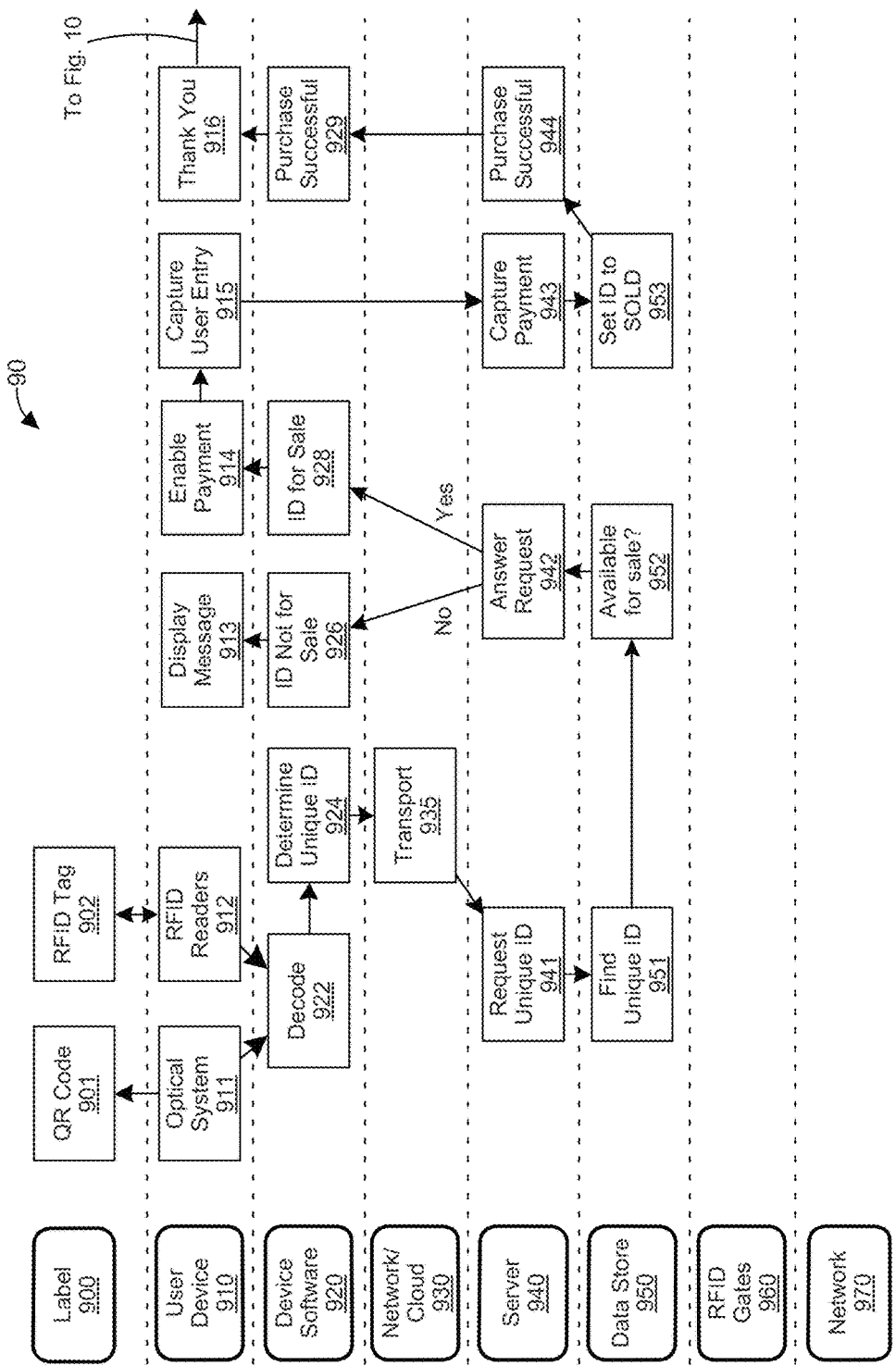
FIGS. 9-11 illustrate a system and method for theft-protected self-checkout, in accordance with some embodiments of the disclosure provided herein.
Figure 10:
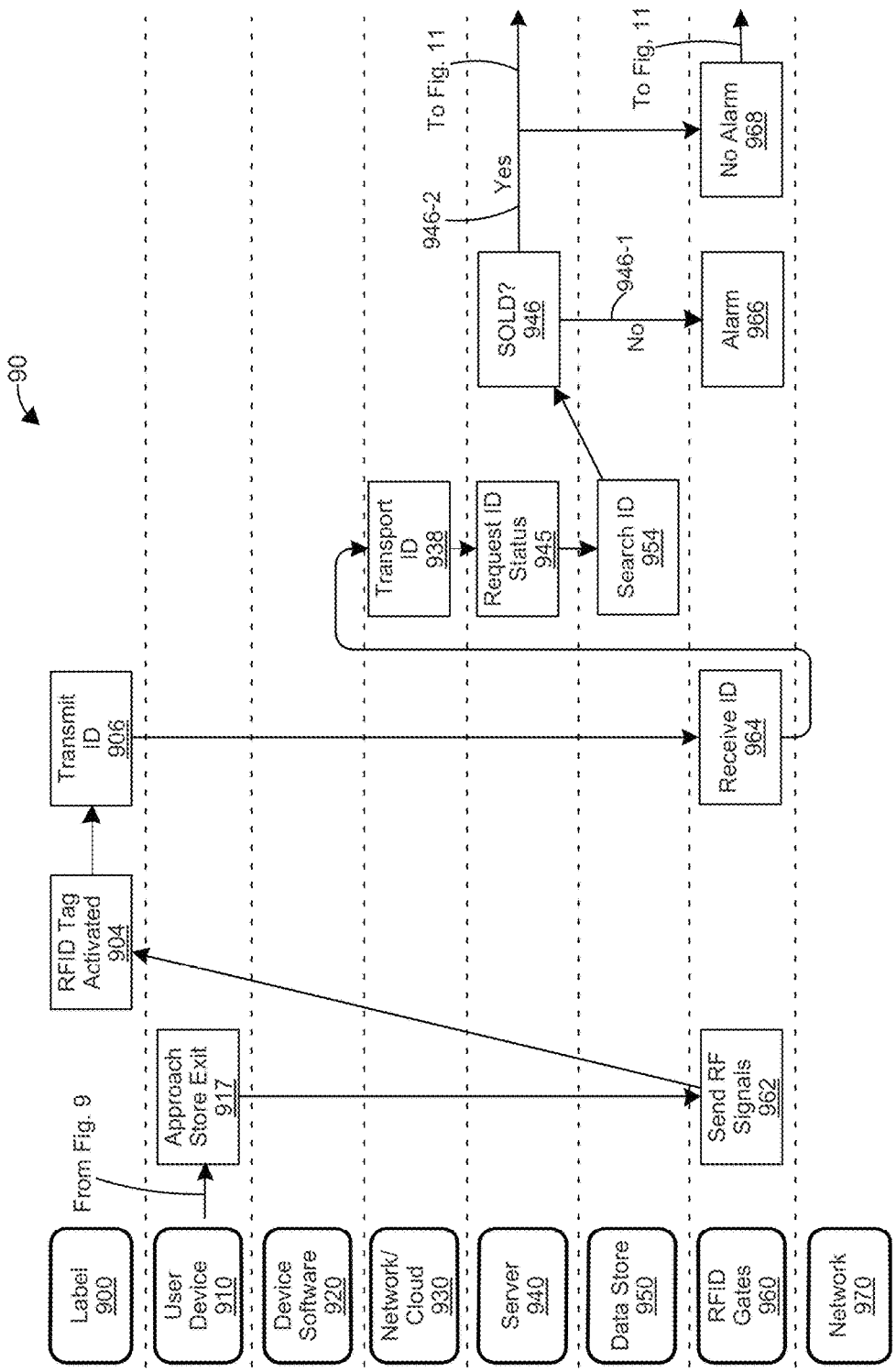
Figure 11:
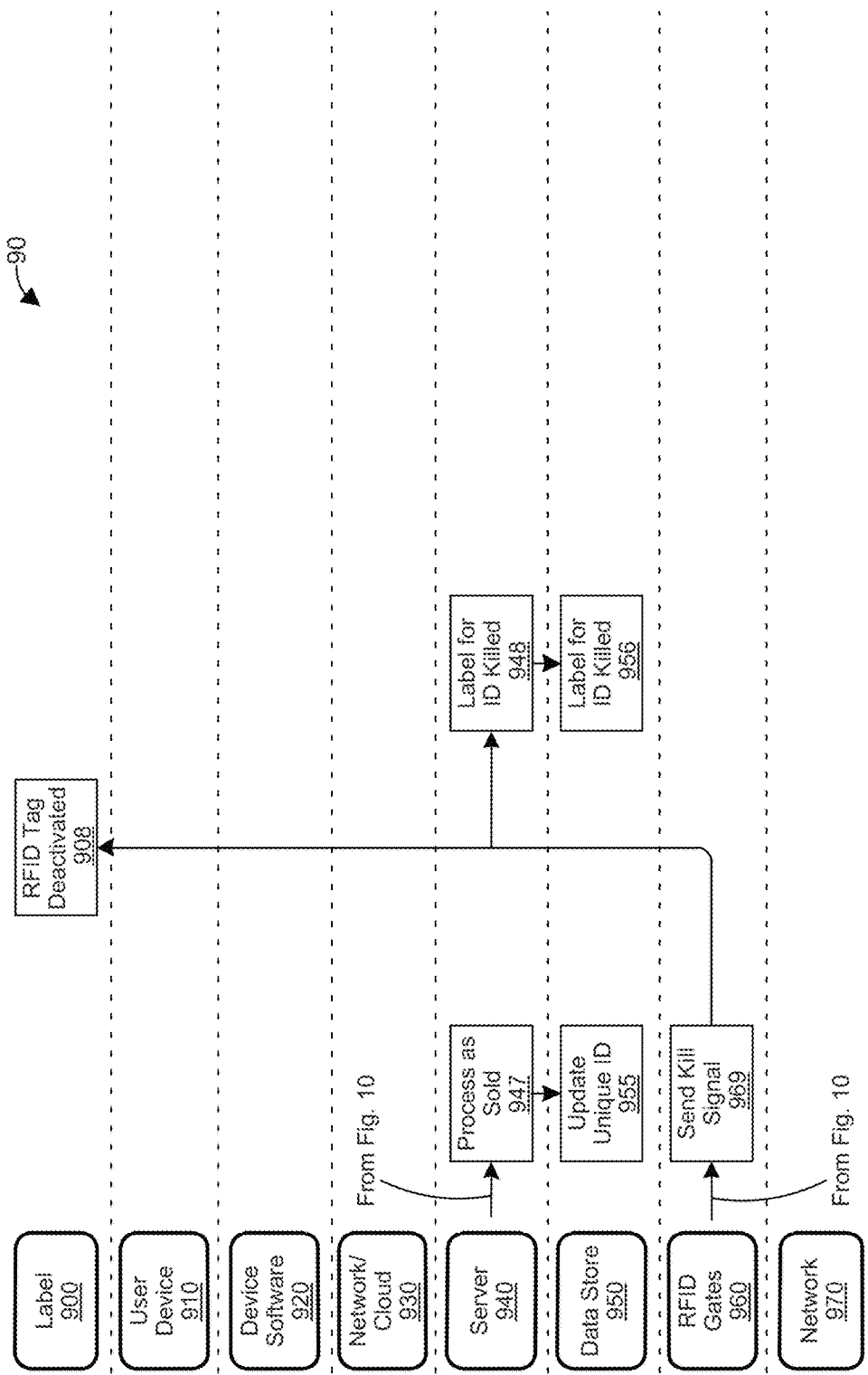

FIGS. 9-11 illustrate a system and method 90 for theft-protected self-checkout according to an embodiment. The system and method 90 can include some or all of the systems and methods described above. A label 900 on a product in a retail store includes a QR code 901 and/or an RFID tag 902. The RFID tag 902 can be activated by a first RFID reader 912 held by a store associate before the product is displayed for sale. To initiate self-checkout, the QR code 901 and/or RFID tag 902 can be read by customer device 910 (e.g., smartphone), which includes a respective optical reader 911 and/or a second RFID reader/interrogator 912. In either case, the customer's device 910 includes an application or software 920 to interpret and decode 922 the information contained in the QR code 901 and/or RFID tag 902. As a result of the interpretation/decoding 922, the software 920 determines the EPC number (or other unique identifier) 924 of the product.

The customer's device 910, in combination with software 920, transmits 935 the EPC number 924 over network/cloud 930 to retail server 940. In some embodiments, the retail server 940 is or includes transaction server 430. The retail server 940 runs an application or other software that provides backend functionality for the retail store. The retail server 940 in turn sends a request 941 to query data store 950 for the EPC number 924 to determine if the product is available for sale 952. For example, the data store 950 can indicate that EPC number 924 is in a SALE state when the product is available for sale. In some embodiments, data store 950 is or includes item database 200 described above. The data store 950 can include a database of EPC numbers and corresponding product states (e.g., SALE, ACTIVE, etc.), as described above. The data store 950 finds 951 the EPC number 924 and its corresponding product state.

If the product state for EPC number 924 is not available for sale (e.g., in the ACTIVE state), the server 940 answers 942 the request from the user device 910 by sending a corresponding message or digital signal (e.g., a zero) that indicates that the product is not available for sale 926, which is interpreted by software 920 on user device 910. The software 920 in turn displays a message 913 (e.g., "Item Not on Sale") on user device 910. If the product state for EPC number 924 is available for sale (i.e., in the SALE state), the server 940 answers 942 the request from the user device 910 by sending a corresponding message or digital signal (e.g., a one) that indicates that the product is available for sale 928, which is interpreted by software 920 on user device 910. The software 920 in turn enable payment 914 and prompts the user to pay for the product. In some embodiments, user device 910, through software 920, provides a confirmation button for the customer to confirm that she intends to purchase the product and/or that the customer is ready to check out.

The payment prompt 914 includes capturing the user's payment information 915, which can be entered into user device 910 (e.g., manually with a physical or virtual keyboard or automatically, e.g., by swiping or optically scanning a payment card). In some embodiments, the customer's payment information 915 is stored in the customer's profile and the customer can select or confirm that she wishes to use the relevant saved payment method. For example, the customer can store a credit card number in her user profile, which can be accessed through software 920. The user can also associate an online payment method (e.g., ApplePay, PayPal, etc.) with her user account or pay directly with such online payment method.

The payment information 915 is transmitted from user device 910 to server 940, which communicates with the relevant payment provider (e.g., credit card company, Apple, etc.) to capture the payment 943. After payment has been captured, server 940 sends a request 953 to data store 950 to update the state associated with EPC number 924 to SOLD. When the state is updated, data store 950 sends an acknowledgment to server 940 that the state update was successful 944 and thus that the purchase was successful. The server 940 in turn sends a message 929 to user device 910, through software 920, to indicate that the purchase was successful. The user device 910 then displays a confirmation and/or thank you message 916 to the customer.

After the transaction is complete, the customer can leave the store with the purchased product. As the customer leaves the store 917, she approaches RFID exit reader 960, which generates radio signals 962 to interrogate any RFID tags in its range. The radio signals 962 activate 904 RFID tag 902 on the purchased product carried by the customer. Through the activation 904, exit reader 960 interrogates the RFID tag 902, which transmits 906 the EPC number 924 for tag 900 of the purchased product. The RFID exit reader 960 receives 964 EPC number 924 and then transmits 938 EPC number 924 over network 930 to server 940. The request is to determine the state of EPC number 924, which is associated with the purchased product that is about to exit the store with the customer.

After server 940 receives the EPC number 924 from RFID exit reader 960, server 940 sends a request 945 to search data store 950 for EPC number 924 to determine the state or status of EPC number 924, for example, if EPC number 924 is in a SOLD state. The data store 950 searches 954 for EPC number 924 in its database and returns the corresponding product state 946 in response to the query. If the product is not in a SOLD state 946-1, the server 940 sends a command to RFID exit reader 960 to trigger an alarm 966. The alarm 966 indicates to associates at the retail store that a theft may be occurring. If the product is in a SOLD state 946-2, the server 940 allows the customer to leave the store without setting an alarm 968. The server 940 also processes 947 the product as sold and out of the store, which includes updating 955 data store 950 to indicate that EPC number 924 is SOLD and out of the store.

The server 940 also sends a command for RFID exit reader 960 to broadcast a kill signal 969 for the RFID tag 902 corresponding to EPC number 924. RFID tag 902 receives the kill signal 969, which deactivates 908 the RFID tag 902. The server 940 receives confirmation 948 that the RFID tag has been deactivated, and then sends an update 956 for data store 950 to indicate that the RFID tag 902 for EPC number 924 has been killed.

Therefore, the present invention allows efficient and secure checkout in a retail store environment. Several electronic self checkout methods can be used by a customer with a mobile communication device having nominal hardware and software communication capabilities present in many current mobile phone devices. Several configurations are also possible in a retail store to support the present invention, including conventional checkout stations at the store exit but also including less obtrusive systems avoiding the conventional POS checkout station and relying instead on hidden transponders. communicating with the customer's mobile device and store server infrastructure.

In an aspect, the invention allows customers more privacy and independence in selecting and checking out from the retail store without being subjected to the scrutiny of store employees (e.g., in purchasing personal items or for customers who find it awkward to seek assistance in checking out certain types of merchandise).

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A method of reducing a risk of loss of an article of merchandise from a retail establishment using a server in communication with a network, the method comprising:
   affixing to said article of merchandise a plurality of labels including an optical label encoded with an optical label identifier and a radio frequency identification (RFID) label encoded with a RFID label identifier, said optical label readable by an optical reader or scanner and said RFID label readable by a RFID reader or scanner;
   recording said optical label identifier, said RFID label identifier and information regarding said article of merchandise in a data store accessible by said server so that said article of merchandise is associated with both said optical label identifier and said RFID label identifier;
   in said server, receiving from a customer mobile device equipped with an optical label reader or scanner, said optical label identifier;
   in said server, querying an item data store using said optical label identifier to determine if the article of merchandise associated with said optical label identifier is available for sale;
   in response to an indication from the item data store that the article of merchandise is available for sale, in said server:
      transmitting product information to the customer mobile device, said product information including at least a price of said article of merchandise;
      receiving from the customer mobile device, over said network, information enabling payment for the article of merchandise so as to effect a sale of said article of merchandise; and
      updating said item data store to reflect that the article of merchandise is sold;
   in response to an indication from the item data store that the article of merchandise is not found in said item data store, in said server:
      querying a master product database to determine if a first item type code for the article of merchandise matches a second item type code for at least one other article of merchandise in the master product database; and
      transmitting an alert or a message to the customer mobile device, the alert or message indicating that the article of merchandise is an unknown article of merchandise;
   with an exit RFID reader in communication with the item data store, determining whether to activate a security alert when the article of merchandise enters a read range of the exit RFID reader, the determining comprising:
      interrogating the RFID label on the article of merchandise to read the RFID label identifier associated with the RFID label;
      transmitting a request from the exit RFID reader to the server, over said network, to determine a label state of the article of merchandise, the request including at least a portion of the RFID label identifier that includes a unique identifier for the article of merchandise;
      in response to a first indication from the server that the article of merchandise has been sold, deactivating the RFID label to thereby deactivate the security alert for the article of merchandise;
      in response to a second indication from the server that the article of merchandise has not been sold, the exit RFID reader activating the security alert for the article of merchandise; and
      in response to a third indication from the server that the unique identifier does not exist in the item data store and that the first item type code for the article of merchandise matches the second item type code for the at least one other article of merchandise in the master product database, the exit RFID reader activating the security alert for the article of merchandise.

2. The method of claim 1, further comprising transmitting a message over the network to the customer mobile device if the article of merchandise is not available for sale.

3. The method of claim 2, wherein the message is transmitted if the article of merchandise is in an ACTIVE state.

4. The method of claim 1, wherein the optical label includes a quick read (QR) code.

5. The method of claim 4, wherein the QR code includes an electronic product code (EPC) for the product.

6. The method of claim 1, further comprising transmitting, over said network, a command to deactivate said RFID label responsive to a sale of said article of merchandise as reflected in said item data store.

7. The method of claim 6, wherein the command is transmitted by an RFID antenna located in the retail store, the RFID antenna in communication with said RFID label.

8. The method of claim 6, wherein the command includes a KILL command.

9. The method of claim 1, said optical label identifier and said RFID label identifier comprising a same unique identification number.

10. The method of claim 1, said optical label identifier and said RFID label identifier comprising different identification numbers that correspond to one another in a one-to-one fashion, and are each uniquely associated with said same article of merchandise, so that one such identification number can be used to determine the other.

11. The method of claim 1, further comprising updating said item data store once said article of merchandise is sold to reflect that the item is in a SOLD status.

12. The method of claim 11, wherein updating the item data store further prevents a security alarm from being activated in connection with said article of merchandise.

13. A method of operating a system having an exit radio frequency identification (RFID) reader and a server in communication with a network to reduce a risk of loss of an article of merchandise from a retail establishment, the article of merchandise having affixing thereto a plurality of labels including an optical label and a RFID label, the optical label encoded with an optical label identifier, the RFID label encoded with a RFID label identifier, said optical label readable by an optical reader or scanner and said RFID label readable by a RFID reader or scanner, the method comprising:
  recording said optical label identifier, said RFID label identifier and information regarding said article of merchandise in a data store accessible by said server so that said article of merchandise is associated with both said optical label identifier and said RFID label identifier;
  in said server, receiving from a customer mobile device equipped with an optical label reader or scanner, said optical label identifier;
  in said server, querying an item data store using said optical label identifier to determine if the article of merchandise associated with said optical label identifier is available for sale;
  in response to an indication from the item data store that the article of merchandise is available for sale, in said server:
    transmitting product information to the customer mobile device, said product information including at least a price of said article of merchandise;
    receiving from the customer mobile device, over said network, information enabling payment for the article of merchandise so as to effect a sale of said article of merchandise; and
    updating said item data store to reflect that the article of merchandise is sold;
  in response to an indication from the item data store that the article of merchandise is not found in said item data store, in said server:
    querying a master product database to determine if a first item type code for the article of merchandise matches a second item type code for at least one other article of merchandise in the master product database; and
    transmitting an alert or a message to the customer mobile device, the alert or message indicating that the article of merchandise is an unknown article of merchandise;
  with said exit RFID reader, determining whether to activate a security alert when the article of merchandise enters a read range of the exit RFID reader, the determining comprising:
    interrogating the RFID label on the article of merchandise to read the RFID label identifier associated with the RFID label;
    transmitting a request from the exit RFID reader to the server, over said network, to determine a label state of the article of merchandise, the request including at least a portion of the RFID label identifier that includes a unique identifier for the article of merchandise;
    in response to a first indication from the server that the article of merchandise has been sold, deactivating the RFID label to thereby deactivate the security alert for the article of merchandise;
    in response to a second indication from the server that the article of merchandise has not been sold, the exit RFID reader activating the security alert for the article of merchandise; and
    in response to a third indication from the server that the unique identifier does not exist in the item data store and that the first item type code for the article of merchandise matches the second item type code for the at least one other article of merchandise in the master product database, the exit RFID reader activating the security alert for the article of merchandise.

* * * * *